US010609582B2

(12) United States Patent
Hannan et al.

(10) Patent No.: US 10,609,582 B2
(45) Date of Patent: Mar. 31, 2020

(54) INTERFERENCE DETECTION AND IDENTIFICATION IN WIRELESS NETWORK FROM RF OR DIGITIZED SIGNAL

(71) Applicant: CommScope Technologies LLC, Hickory, NC (US)

(72) Inventors: Ariful Hannan, Sterling, VA (US); Khalid W. Al-Mufti, Sterling, VA (US); Thomas B. Gravely, Herndon, VA (US); Andrew E. Beck, Ashburn, VA (US)

(73) Assignee: CommScope Technologies LLC, Hickory, NC (US)

( * ) Notice: Subject to any disclaimer, the term of this patent is extended or adjusted under 35 U.S.C. 154(b) by 225 days.

(21) Appl. No.: 15/691,615

(22) Filed: Aug. 30, 2017

(65) Prior Publication Data
US 2018/0070254 A1    Mar. 8, 2018

Related U.S. Application Data

(60) Provisional application No. 62/384,953, filed on Sep. 8, 2016.

(51) Int. Cl.
H04W 24/08    (2009.01)
H04W 52/24    (2009.01)
(Continued)

(52) U.S. Cl.
CPC ........ H04W 24/08 (2013.01); H04B 17/0085 (2013.01); H04B 17/26 (2015.01);
(Continued)

(58) Field of Classification Search
None
See application file for complete search history.

(56) References Cited

U.S. PATENT DOCUMENTS 6,304,594 B1 * 10/2001 Salinger ............... H04B 1/1027
                                                       375/222
7,529,215 B2    5/2009  Osterling
(Continued)

FOREIGN PATENT DOCUMENTS

EP    2381597    10/2011
EP    2521418    11/2012
(Continued)

OTHER PUBLICATIONS

European Patent Office, "Summons to attend oral proceedings pursuant to Rule 115(1) from EP Application No. 13870842.5 mailed Feb. 21, 2019", from Foreign Counterpart to U.S. Appl. No. 13/835,652, pp. 1-6, Published: EP.
(Continued)

Primary Examiner — Anez C Ebrahim
(74) Attorney, Agent, or Firm — Fogg & Powers LLC

(57) ABSTRACT

A method for detecting interference in a wireless system is disclosed. The method includes receiving an uplink signal at a remote radio head in a distributed base station, passing the uplink signal from the remote radio head to a baseband unit over a front-haul communication link as baseband IQ data, and intercepting the baseband IQ data at a tester coupled between the remote radio head and the baseband unit. Processing of the IQ data is performed to determine whether an interfering signal is present in the uplink signal.

13 Claims, 10 Drawing Sheets

(51) Int. Cl.
*H04W 72/08* (2009.01)
*H04B 17/00* (2015.01)
*H04B 17/345* (2015.01)
*H04B 17/26* (2015.01)

(52) U.S. Cl.
CPC .......... *H04B 17/345* (2015.01); *H04W 52/24* (2013.01); *H04W 72/082* (2013.01)

(56) References Cited

U.S. PATENT DOCUMENTS

| | | |
|---|---|---|
| 7,555,669 B2 | 6/2009 | Wong et al. |
| 7,571,338 B2 | 8/2009 | Osterling et al. |
| 7,646,751 B2 | 1/2010 | Osterling et al. |
| 7,680,149 B2 | 3/2010 | Liu et al. |
| 7,751,393 B2 | 7/2010 | Chaskar et al. |
| 7,937,110 B2 | 5/2011 | Wu et al. |
| 8,005,152 B2 | 8/2011 | Wegener |
| 8,018,910 B2 | 9/2011 | Jiang et al. |
| 8,050,296 B2 | 11/2011 | Osterling |
| 8,194,597 B2 | 6/2012 | Feder et al. |
| 8,199,659 B2 | 6/2012 | Mergler et al. |
| 8,204,144 B2 | 6/2012 | Takada et al. |
| 8,346,091 B2 | 1/2013 | Kummetz et al. |
| 8,363,741 B2 | 1/2013 | Patanapongpibul et al. |
| 8,437,315 B2 | 5/2013 | Kostic et al. |
| 8,903,324 B1 | 12/2014 | Bradley |
| 9,014,052 B2 | 4/2015 | Gravely et al. |
| 10,038,522 B1 | 7/2018 | Ju et al. |
| 2002/0094785 A1 | 7/2002 | Deats |
| 2003/0122534 A1 | 7/2003 | Seppinen et al. |
| 2004/0037285 A1 | 2/2004 | Viero et al. |
| 2005/0095986 A1 | 5/2005 | Hassan et al. |
| 2005/0249221 A1 | 11/2005 | Remi et al. |
| 2007/0171866 A1 | 7/2007 | Merz et al. |
| 2008/0008122 A1 | 1/2008 | Yoon |
| 2008/0011171 A1 | 1/2008 | Schneider et al. |
| 2008/0013480 A1 | 1/2008 | Kapoor et al. |
| 2008/0037435 A1 | 2/2008 | Sankala |
| 2008/0102897 A1 | 5/2008 | Song et al. |
| 2008/0144522 A1 | 6/2008 | Chang et al. |
| 2008/0181171 A1 | 7/2008 | Koziy et al. |
| 2009/0149221 A1 | 6/2009 | Liu et al. |
| 2010/0022251 A1 | 1/2010 | Watanabe et al. |
| 2010/0029282 A1 | 2/2010 | Stamoulis et al. |
| 2010/0085061 A1 | 4/2010 | Bradley et al. |
| 2010/0121897 A1 | 5/2010 | Bal et al. |
| 2010/0329404 A1 | 12/2010 | Xiang et al. |
| 2011/0032910 A1 | 2/2011 | Aarflot et al. |
| 2011/0119550 A1 | 5/2011 | Fantaske |
| 2011/0190005 A1 | 8/2011 | Cheon et al. |
| 2011/0234336 A1 | 9/2011 | Hershtig |
| 2011/0310810 A1 | 12/2011 | Kenington et al. |
| 2012/0009948 A1 | 1/2012 | Powers et al. |
| 2012/0057572 A1 | 3/2012 | Evans et al. |
| 2012/0113972 A1 | 5/2012 | Lie et al. |
| 2012/0236818 A1 | 9/2012 | Kaminski et al. |
| 2012/0250740 A1 | 10/2012 | Ling |
| 2013/0055286 A1 | 2/2013 | Griffioen |
| 2013/0071112 A1 | 3/2013 | Melester et al. |
| 2013/0100823 A1* | 4/2013 | Ren ...................... H04W 24/02 370/241 |
| 2013/0272170 A1 | 10/2013 | Chatterjee et al. |
| 2014/0003314 A1 | 1/2014 | Shu et al. |
| 2014/0049267 A1 | 2/2014 | Cordaro |
| 2014/0119197 A1 | 5/2014 | Maca et al. |
| 2014/0185601 A1 | 7/2014 | Ilyadis |
| 2014/0198684 A1 | 7/2014 | Gravely et al. |
| 2014/0369311 A1 | 12/2014 | Bi et al. |
| 2014/0378047 A1 | 12/2014 | Kennard |
| 2015/0023194 A1* | 1/2015 | Seo ...................... H04W 24/10 370/252 |
| 2015/0084782 A1 | 3/2015 | Zhang et al. |
| 2015/0133111 A1 | 5/2015 | Bevan et al. |
| 2015/0257165 A1 | 9/2015 | Gale et al. |
| 2015/0271003 A1 | 9/2015 | Kuchi et al. |
| 2016/0074005 A1 | 3/2016 | Corl |
| 2016/0157115 A1 | 6/2016 | Kim et al. |
| 2016/0352369 A1 | 12/2016 | Smith |
| 2016/0380668 A1 | 12/2016 | Aoki et al. |
| 2017/0214370 A1* | 7/2017 | Tseng ................... H03F 1/0222 |
| 2017/0245162 A1 | 8/2017 | Beck et al. |
| 2017/0257833 A1 | 9/2017 | Hannan et al. |
| 2018/0248576 A1 | 8/2018 | Coe et al. |
| 2018/0337718 A1 | 11/2018 | Srinivasan |

FOREIGN PATENT DOCUMENTS

| | | |
|---|---|---|
| WO | 2011072595 A1 | 6/2011 |
| WO | 2012062080 | 5/2012 |
| WO | 2012116007 | 8/2012 |
| WO | 2012171133 | 12/2012 |
| WO | 2015133952 | 9/2015 |
| WO | 2017072552 A1 | 5/2017 |
| WO | 2017151460 A1 | 9/2017 |

OTHER PUBLICATIONS

U.S. Patent and Trademark Office, "Office Action", U.S. Appl. No. 15/335,235, dated Mar. 28, 2019, pp. 1-33, Published: US.
European Patent Office, "Communication pursuant to Article 94(3) from EP Application No. 13870842.5 dated Jan. 29, 2018", from Foreign Counterpart to PCT Application No. PCT/US13/32030, Jan. 29, 2018, pp. 1-5, Published: EP.
Gardner, "Exploitation of Spectral Redundancy in Cyclostationary Signals", IEEE Signal Processing Magazine, Apr. 1991, pp. 1-24, IEEE.
International Bureau, "International Preliminary Report on Patentability from PCT Application No. PCT/US2013/032030 dated Jul. 14, 2015", from Foreign Counterpart to U.S. Appl. No. 13/835,652, dated Jul. 14, 2015, pp. 1-8, Published: WO.
International Bureau, "International Preliminary Report on Patentability from PCT Application No. PCT/US2017/019586 dated Sep. 13, 2018", from Foreign Counterpart to U.S. Appl. No. 15/335,235, dated Sep. 13, 2018, pp. 1-12, Published: WO.
U.S. Patent and Trademark Office, "Decision on Petition", U.S. Appl. No. 13/835,652, dated Mar. 15, 2016, pp. 1-2, Published: US.
U.S. Patent and Trademark Office, "Office Action", U.S. Appl. No. 15/491,914, dated Nov. 20, 2018, pp. 1-59, Published: US.
U.S. Patent and Trademark Office, "Restriction Requirement", U.S. Appl. No. 15/335,235, dated Nov. 29, 2018, pp. 1-6, Published: US.
Patent Cooperation Treaty, "Notification of Transmittal of the International Search Report and the Written Opinion of the International Search Authority, or the Declaration, from PCT Application No. PCT/US2016/068108, dated Apr. 7, 2017", "from Foreign Counterpart of U.S. Appl. No. 62/270,362", filed Apr. 7, 2017, pp. 1-14, Published in: PCT.
European Patent Office, "Extended European Search Report from EP Application No. 13870842.5 dated Aug. 10, 2016", "from Foreign Counterpart of U.S. Appl. No. 13/835,652", dated Aug. 10, 2016, pp. 1-9, Published in: EP.
United States Patent and Trademark Office, "Notice of Allowance", "From U.S. Appl. No. 13/835,652", dated Dec. 19, 2014, pp. 1-7, Published in: US.
U.S. Patent and Trademark Office, "Office Action", "From U.S. Appl. No. 13/835,652", dated Aug. 20, 2014, pp. 1-7, Published in: US.
Patent Cooperation Treaty, "International Search Report and Written Opinion, from PCT Application No. PCT/US2013/032030, dated Oct. 18, 2013", "from Foreign Counterpart of U.S. Appl. No. 13/835,652", dated Oct. 18, 2013, pp. 1-8, Published in: WO.
Patent Cooperation Treaty, "Notification of Transmittal of the International Search Report and the Written Opinion of the International Searching Authority, or the Declaration, from PCT No. PCT/US2017019586, dated May 26, 2017", "from Foreign Counterpart of U.S. Appl. No. 15/335,235", filed May 26, 2017, pp. 1-15.
Altera Corporation, "Implementing the CPRI Protocol Using the Deterministic Latency Transceiver PHY IP Core", "Altera Corporation", Jan. 2012, pp. 1-16, Published in: San Jose, CA.

(56) References Cited

OTHER PUBLICATIONS

Commscope, Inc., "Optical PIM Tester", Nov. 10, 2015, pp. 1-2.

Chun-Hui et al., "Research of CPRI Protocol Based on High-Speed Fiber Link", "2010 Second International Conference on Information Technology and Computer Science", 2010, pp. 336-339, Publisher: IEEE Computer Society.

CommScope, Inc., "Optical PIM Tester", 2015, pp. 1-4, Publisher: CommScope, Inc.

CommScope, Inc., "User Manual for Optical PIM Tester", Dec. 2015, pp. 1-49, Publisher: CommScope, Inc.

Samardzija et al., "Compressed Transport of Baseband Signals in Radio Access Networks", "IEEE", Sep. 2012, pp. 3216-3225, vol. 11, No. 9, Publisher: IEEE Transactions on Wireless Communications.

Hannan, "Signal Power/Quality Measurement From Digital RF/IF Interface", "U.S. Appl. No. 15/249,027, filed Aug. 26, 2016", Aug. 26, 2016, pp. 1-31, Published in: US.

Hannan et al., "Signal Detection From Digital Interface", "U.S. Appl. No. 15/335,235, filed Oct. 26, 2016", Oct. 26, 2016, pp. 1-37, Published in: US.

Beck et al., "Passive Intermodulation (PIM) Testing in Distributed Base Transceiver Station Architecture", "U.S. Appl. No. 15/430,211, filed Feb. 10, 2017", Feb. 10, 2017, pp. 1-35.

Fugal, Conceptual Wavelets in Digital Signal Processing: An In-Depth, Practical Approach for the Non-Mathematician, Date Published: 2009, Space & Signals Technical Publishing, Sand Diego, California, pp. 1-100.

Gardner, Cyclostationarity in Communications and Signal Processing, 1994, IEEE Communication Society, pp. 1-260.

U.S. Patent and Trademark Office, "Office Action", U.S. Appl. No. 15/430,211, dated Jun. 24, 2019, pp. 1-45, 3ublished: US.

U.S. Patent and Trademark Office, "Office Action", U.S. Appl. No. 15/491,914, dated Jun. 28, 2019, pp. 1-34, 3ublished: US.

Zhiqiang et al., "Exploration for the Calibration of Passive Intermodulation Analyzer", The Eighth International Conference on Electronic Measurement and Instruments (ICEMI), 2007, pp. 1-4.

U.S. Patent and Trademark Office, "Final Office Action", U.S. Appl. No. 15/335,235, dated Aug. 15, 2019, pp. 1-21, Published: US.

* cited by examiner

INTERFERENCE DETECTION AND IDENTIFICATION IN WIRELESS NETWORK FROM RF OR DIGITIZED SIGNAL

BACKGROUND

The traditional monolithic RF base transceiver station (BTS) architecture is increasingly being replaced by a distributed BTS architecture in which the functions of the BTS are separated into two physically separate units—a baseband unit (BBU) and a remote radio head (RRH). The BBU performs baseband processing for the particular air interface that is being used to wirelessly communicate over the RF channel. The RRH performs radio frequency processing to convert baseband data output from the BBU to radio frequency signals for radiating from one or more antennas coupled to the RRH and to produce baseband data for the BBU from radio frequency signals that are received at the RRH via one or more antennas.

The RRH is typically installed near the BTS antennas, often at the top of a tower, and the BBU is typically installed in a more accessible location, often at the bottom of the tower. The BBU and the RRH are typically connected through one or more fiber optic links. The interface between the BBU and the RRH is defined by front-haul communication link standards such as the Common Public Radio Interface (CPRI) family of specifications, the Open Base Station Architecture Initiative (OBSAI) family of specifications, and the Open Radio Interface (ORI) family of specifications.

Wireless operators are under constant pressure to increase the speed, capacity and quality of their networks while continuing to hold the line on cost. As technologies evolve, the challenge is becoming increasingly difficult. For example, the frequency spectrum available to these operators is a scarce resource. As the use of the available frequency spectrum increases, any network or non-network induced interference may limit the ability of service providers to provide services that meet consumer demands for speed, capacity and quality. Interference can be caused by unintended (i.e. rogue, spurious) transmission in the licensed band or inter-modulation signals generated from the intended RF transmissions.

When an intermodulation signal in the downlink or other interference signal overlap in frequency-time with the uplink desired signal, it could be difficult to isolate or detect the presence of the interfering signal by just looking at a plot of the uplink spectrum. Spectral estimation becomes more complex when desired signals are bursty in nature in the frequency-time domain plane. Long-Term Evolution (LTE) 4G air interface is such a protocol where the uplink and downlink frequency-time assignment changes very frequently—almost every millisecond. In the case of passive inter-modulation, the downlink intermodulation signal can end up in the uplink band for certain band arrangements. For most wireless protocols, it is hard to identify the downlink intermodulation from the uplink signal if it is overlapped in time and frequency.

Therefore, there is a need in the art for techniques to monitor and manage interference so that wireless networks can provide services over their limited spectrum to meet consumer demands for speed, capacity and quality.

DRAWINGS

DETAILED DESCRIPTION

Embodiments of the present invention enable operators to detect interference in wireless systems from baseband signals communicated over a front-haul communication link (interface) between a baseband unit (BBU) and a remote radio head (RRH) in a distributed base station. The detection mechanism works by extracting complex digitized signals from this interface, such as but not limited to a CPRI, OBSAI or ORI interface, and applying some signal processing and statistical algorithms to detect the presence of the interfering signal. One type of interference that can be detected is inter-modulation in the down link signal. In this case, the signals transmitted from the base station radio could be the signals which are transmitted in normal operational mode or the base station radio could transmit signals that hold special characteristics as specified in the techniques. These special transmission signals will be generated by a tester, inserted in the front-haul communication link between the BBU and the RRH (as described in more detail below). In one embodiment, the tester injects these special transmission signals in the front-haul communication link, e.g., at the CPRI interface.

Distributed Base Station System

Figure 1:
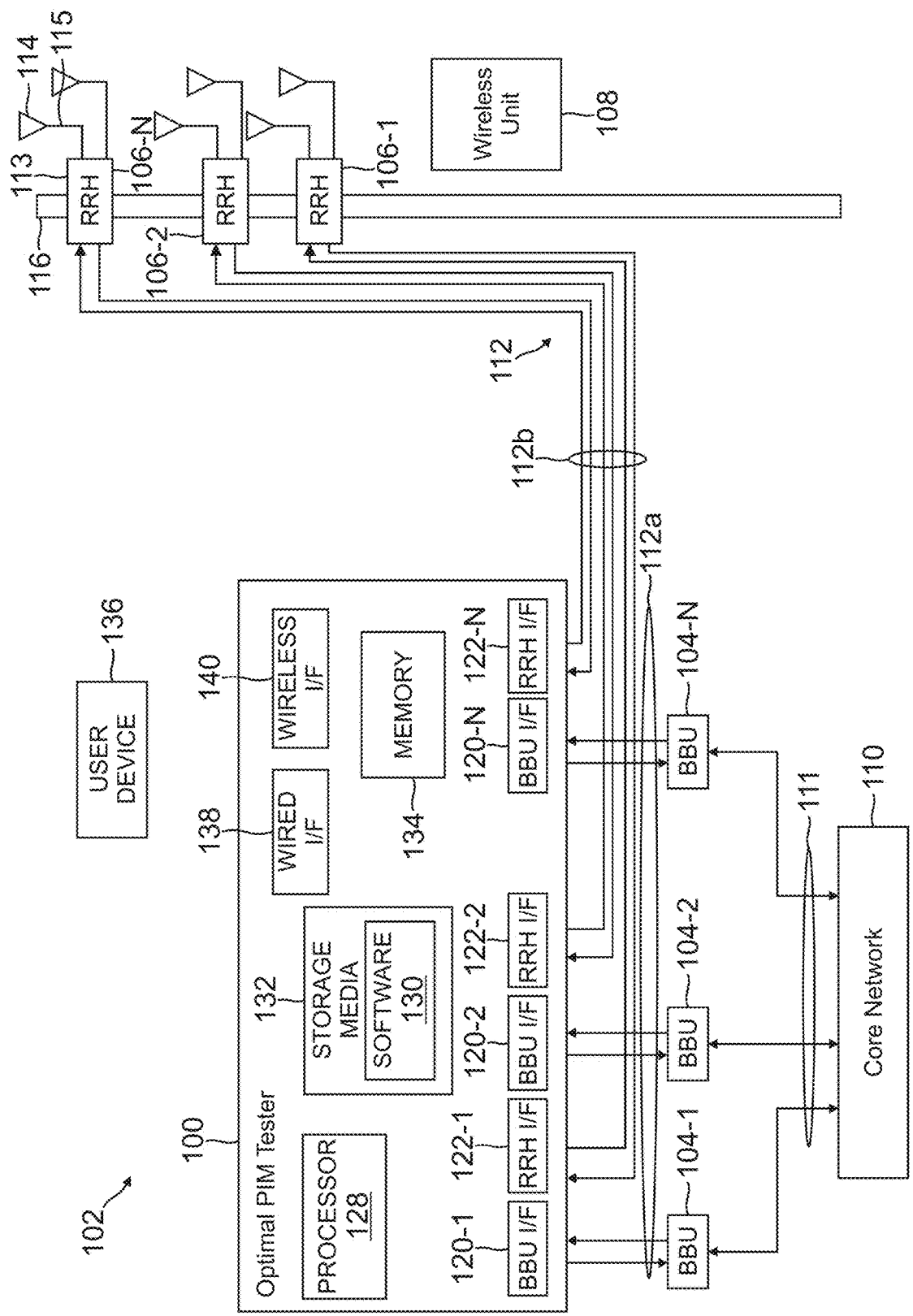
FIG. 1 is a block diagram of a distributed base station with a tester coupled in an optical communication link between a baseband unit (BBU) and a remote radio head (RRH) of the distributed base station according to one aspect of the present invention.

FIG. 1 is a block diagram of one exemplary embodiment of tester 100 for a distributed base station system, indicated generally at 102, within which the techniques for detecting interfering signals described here can be used.

In the exemplary embodiment shown in FIG. 1, the system 102 comprises a plurality of baseband units (BBU) 104-1 to 104-N and a plurality of remote radio heads (RRH) 106-1 to 106-N that communicate over a plurality of wireless radio frequency (RF) channels with one or more wireless units 108 (such as mobile telephones, smartphones, tablets, wireless modems for laptops or other computers or for other devices such as wireless sensors or other "Internet of Things" (IOT) or machine-to-machine (M2M) devices) using one or more standard wireless air interfaces. The exemplary embodiment of system 102 shown in FIG. 1 may support several air interfaces, e.g., three air interfaces including, but not limited to, Long-Term Evolution (LTE) 4G air interface described in the "Third Generation Partnership Project (3GPP) Technical Specification (TS) 36.211 Evolved Universal Terrestrial Radio Access (E-UTRA); Physical Channels and Modulation" specification produced by the 3GPP, Advanced Wireless Services (AWS-1), Personal Communications Services (PCS), CLR, GSM, WiMax, and others. It is to be understood that other air interfaces can be used.

Each BBU 104 is communicatively coupled to the core network 110 of a wireless service provider using a suitable bi-directional backhaul communication link 111 and interface (for example, using a wireless or wired ETHERNET connection and using the LTE S1 interface). The backhaul communication link 111 can also be used for base station-to-base station communications using the LTE X2 interface.

Each BBU 104 is communicatively coupled to a corresponding RRH 106 using a bi-directional front-haul communication link 112. In the exemplary embodiment shown in FIG. 1, the bi-directional front-haul communication link 112 is implemented using a plurality of pairs of optical fibers, where, in each pair, one optical fiber is used for downlink communications from the BBU 104 to the RRH 106 and the other optical fiber is used for uplink communications from the RRH 106 to the BBU 104. Further, as shown in FIG. 1, the plurality of optical fibers 112 are split into two parts; a first part 112a connecting BBU 104 to optical PIM tester 100 and a second part 112b connecting tester 100 to a respective RRH 106. It is to be understood that the front-haul communication link 112 can be implemented in other ways. The exemplary embodiment shown in FIG. 1 is described here as using a CPRI interface for communications between each BBU 104 and the corresponding RRH 106 over the front-haul communication link 112. It is to be understood, however, that a different front-haul interface could be used (for example, the OBSAI or ORI interface).

As noted above, each BBU 104 performs baseband processing for the particular air interface that is being used to wirelessly communicate over its assigned RF channel, and the RRH 106 performs radio frequency processing to convert baseband data output from the BBU 104 to radio frequency signals for radiating from one or more antennas 114 that are connected to the RRH 106 at antenna port 113 via coaxial cable 115 and to produce baseband data for the associated BBU 104 from radio frequency signals that are received at the RRH 106 via one or more antennas 114.

During normal operation of the system 102, in the downlink direction, the BBUs 104 generate downlink baseband IQ data to encode frames of downlink user and control information received from the core network for communication to the wireless units 108 over the appropriate wireless RF channels. The downlink baseband IQ data is communicated from the BBUs 104 to the RRHs 106 over the respective front-haul communication link 112. The RRHs 106 receive the downlink baseband IQ data and generate one or more downlink analog radio frequency signals that are radiated from the one or more antennas 114 for reception by the wireless units 108. The wireless units 108 perform baseband processing, in accordance with the air interface, on the received downlink analog RF downlink signals in order to recover the frames of downlink user and control information.

During normal operation of the system 102, in the uplink direction, the wireless units 108 generate, in accordance with the air interface, uplink analog radio frequency signals that encode uplink user and control information that is to be communicated to the core network 110 and transmits the generated uplink analog RF signals over the wireless RF channel. The uplink analog RF signals are received by one or more antennas 114 connected to the RRHs 106. The RRH 106 that receives the uplink analog RF signal produces uplink baseband IQ data from the received uplink analog RF signals. The uplink baseband IQ data is communicated from the RRH 106 to the associated BBU 104 over the front-haul communication link 112. The BBU 104 receives the uplink baseband IQ data and performs baseband processing, in accordance with the air interface, on the uplink baseband IQ data in order to recover the uplink user and control information transmitted from the wireless units 108. The BBU 104 communicates the recovered uplink user and control information to the core network 110 over the backhaul communication link 111 using the backhaul interface.

The RRHs 106 are typically installed remotely from its corresponding BBU 104, near the antennas 114 and is mounted to a structure 116 (such as a tower, pole, building, tree, or other structure). For example, the RRH 104 can be mounted near the top of the structure 116 and the BBU 104 can be located on the ground, where the optical fibers used to implement the front-haul communication link 112 run up the structure 116 to couple the BBU 104 to the RRU 106. Although FIG. 1 shows the RRH 106 mounted near the top of structure 116, the RRH 106 can be mounted at other positions relative to the structure 116, for example, approximately midway between the bottom and top of the structure 116.

Tester

Tester 100 can be coupled to the font-haul communication link (interface) 112 in order to capture (intercept) downlink and uplink frames of data communicated between the plurality of BBUs 104 and the respective plurality of RRHs 106 while the plurality of BBUs 104 and the plurality of RRHs 106 are operating normally. Also, the tester 100 can inject a test signal, e.g., baseband IQ data (e.g. carrier wave (CW) tones or a modulated signal), into the frames of data communicated over the front-haul communication link 112. In the exemplary embodiment shown in FIG. 1, tester 100 performs a number of tests discussed in more detail below.

Connecting test equipment directly to the antenna ports 113 of the RRH 106 is typically inconvenient, especially when the RRH 106 is mounted near the top of a tower or other structure 116. To avoid having to do this, the tester 100 is conveniently coupled to the front-haul communication link 112 near the BBUs 104. This is typically at the base of structure 116 and is thus easily accessible to a technician for running the tests described in more detail below.

In the exemplary embodiment shown in FIG. 1, the tester 100 is coupled to the front-haul communication link 112 by connecting the tester 100 in-line with the plurality of BBUs 104 and the plurality of RRHs 106. The tester 100, in this exemplary embodiment, includes two bi-directional optical interfaces 120, 122 for each RF band supported by the system 102. For each BBU 104, a BBU optical interface 120 provides a connection between tester 100 and the associated BBU 104. Additionally, a RRH optical interface 122 provides a connection between the optical PIM tester and the associated RRH 106. Each optical interface 120 and 122 comprises a pair of optical connectors (for example, a pair of LC optical connectors) and an optical transceiver for sending optical signals over one of the optical fibers 112 and for receiving optical signals from another of the optical fibers 112. In one implementation, each optical interface 120 and 122 is implemented using a small form-factor pluggable (SFP) modular optical transceiver that includes integrated optical LC connectors.

Each of the optical interfaces 120 and 122 also includes a respective physical layer device (PHY). In the exemplary embodiment shown in FIG. 1, where a CPRI interface is established over the front-haul communication link 112, the physical layer devices comprise CPRI physical layer devices.

The pair of optical fibers 112b that is connected to one of the plurality of RRUs 106 at one end and that normally would be connected to a corresponding BBU 104 at the other end is instead disconnected from the corresponding BBU 104 and connected to the corresponding RRH optical interface 122 of the tester 100. One end of another pair of optical fibers 112a is connected to the corresponding BBU 104, where the other end of that second pair of optical fibers 112a is connected to the corresponding BBU optical interface 120. It is to be understood, however, that the tester 100 can be coupled to the front-haul communication link 112 in other ways (for example, using passive optical couplers).

In the exemplary embodiment shown in FIG. 1, the tester 100 further comprises one or more programmable processors 128 for executing software 130. The software 130 comprises program instructions that are stored (or otherwise embodied) on or in an appropriate non-transitory storage medium or media 132 (such as flash or other non-volatile memory, magnetic disc drives, and/or optical disc drives) from which at least a portion of the program instructions are read by the programmable processor 128 for execution thereby. Although the storage media 132 is shown in FIG. 1 as being included in, and local to, the tester 100, it is to be understood that remote storage media (for example, storage media that is accessible over a network) and/or removable media can also be used. The tester 100 also includes memory 134 for storing the program instructions (and any related data) during execution by the programmable processor 128. Memory 134 comprises, in one implementation, any suitable form of random access memory (RAM) now known or later developed, such as dynamic random access memory (DRAM). In other embodiments, other types of memory are used. Functionality described here as being implemented in software 130 can be implemented in other ways (for example, using an application specific integrated circuit (ASIC) or field programmable gate array (FPGA)).

The software 130 executing on the programmable processor 128 sends and receives frames of user plane and control plane information with the physical layer devices included in the optical interfaces 120 and 122. For example, the software 130 is configured to capture downlink frames in order to determine system information that the BBU 104 and the RRU 106 are using for communicating with each other and with the wireless units 108 over the wireless RF channel (for example, information identifying what RF frequency channels are being used to communicate over the RF frequency channel).

In this exemplary embodiment, the tester 100 operates in a test mode. In this mode, downlink CPRI frames are transmitted by the BBU 104 on the front-haul communication link 112a. The optical signals are received at the BBU optical interface 120, which converts the received optical signal to an electrical signal that is provided to the CPRI PHY included in the BBU optical interface 120. The CPRI PHY extracts the downlink CPRI frames from the received signals and communicates the downlink CPRI frames to the programmable processor 128 for processing by the software 130. The software 130 is configured to insert digital baseband IQ data for various tests into a desired antenna container (A×C) included in the downlink CPRI frames. That is, the baseband IQ data that the BBU 104 originally included in that A×C is replaced with the baseband IQ data for the test signals. The software 130 forwards the modified downlink CPRI frames to the CPRI PHY in the RRH optical interface 122 for transmitting the modified downlink CPRI frames to the RRU 106 over the downlink fiber included in the front-haul communication link 112b. The RRU 104 extracts the digital baseband IQ data for that A×C and then generates an analog RF signal (tones) that comprises the test signals and outputs the test signals on the relevant antenna port 113.

In the uplink, RRH 106 receives RF signals at antenna 114. RRH 106 generates uplink CPRI frames (baseband IQ data) and the uplink CPRI frames are transmitted from the RRH 106 on the front-haul communication link 112b. The uplink CPRI frames are captured (intercepted) by the tester 100 and processed according to the various tests described in more detail below. That is, uplink CPRI frames transmitted by the RRH 106 on the front-haul communication link 112b. The optical signals are received at the RRH optical interface 122, which converts the received optical signal to an electrical signal that is provided to the CPRI PHY included in the RRH optical interface 122. The CPRI PHY extracts the uplink CPRI frames from the received signals and communicates the uplink CPRI frames to the programmable processor 128 for processing by the software 130. The software 130 is configured to extract the uplink baseband IQ data from the A×Cs included in the uplink CPRI frames and process that baseband IQ data in order to perform the desired tests.

A user can interact with the software 130 executing on the tester 100 using a user device 136, e.g., smartphone, tablet, or computer. The user device 136 is communicatively coupled to the tester 100. In the exemplary embodiment shown in FIG. 1, the tester 100 includes one or more wired interfaces 138 (for example, an ETHERNET interface and/or a USB interface) and wireless interfaces 140 (for example, a Wi-Fi wireless interface) to communicatively couple the tester 100 to a local area network or directly to the user device 136. Moreover, a remotely located user device 136 can access the tester 100 via a connection established over the local area network and/or a public network such as the Internet. In one embodiment, the software 130 implements a webserver that is operable to present a browser-based user interface that enables a user to use a general-purpose Internet browser installed on the user device 136 to interact with the software 130 on the tester 100.

Although the embodiments described above are described as using antenna carriers in downlink CPRI frames, it is to be understood that the techniques described here can be used with other streams of baseband IQ data (for example, streams of baseband IQ data communicated over an OBSAI or ORI interface).

Interference Detection and Identification Techniques

Tester 100 includes program code (software) 130 stored in memory 132 and run on processor 128 to detect and identify interference in the wireless system, e.g., distributed base station 102. As an overview, embodiments of the present invention identify interfering signals using techniques including:

(1) Measuring signal statistics.
(2) Measuring unique cyclic frequency.
(3) Spectral analysis and estimation.

Each of these techniques applies signal processing on IQ data in the front-haul communication link 112 and is addressed in turn below.

1. Measuring Signal Statistics

It has been discovered that measuring some specific statistics of the uplink signal can reveal if the uplink signal is corrupted by interference or downlink IM signal. When an interference signals, including but not limited to downlink intermodulation signals, overlap in frequency-time with the uplink desired signal it could be difficult to isolate or detect the presence of the interfering signal by just looking at the uplink spectrum. Spectral estimation becomes more complex when signals are bursty in nature in the frequency-time domain plane. LTE is such a protocol where the uplink and downlink frequency-time assignment changes very frequently—almost every millisecond.

In the case of passive inter-modulation, the downlink IM signal can end up in the uplink for certain band arrangements. For most wireless protocols, it is hard to identify the DL inter-modulation from the UL signal if it is overlapped in time and frequency. However, advantageously, by applying signal processing to the uplink signals, it is possible to detect the presence of interfering signals in the uplink signal band. A first such technique involves use of the peak-to-average power ratio of the uplink signal.

A. Peak-to-Average Power Ratio (PAPR)

Figures 3, 4:
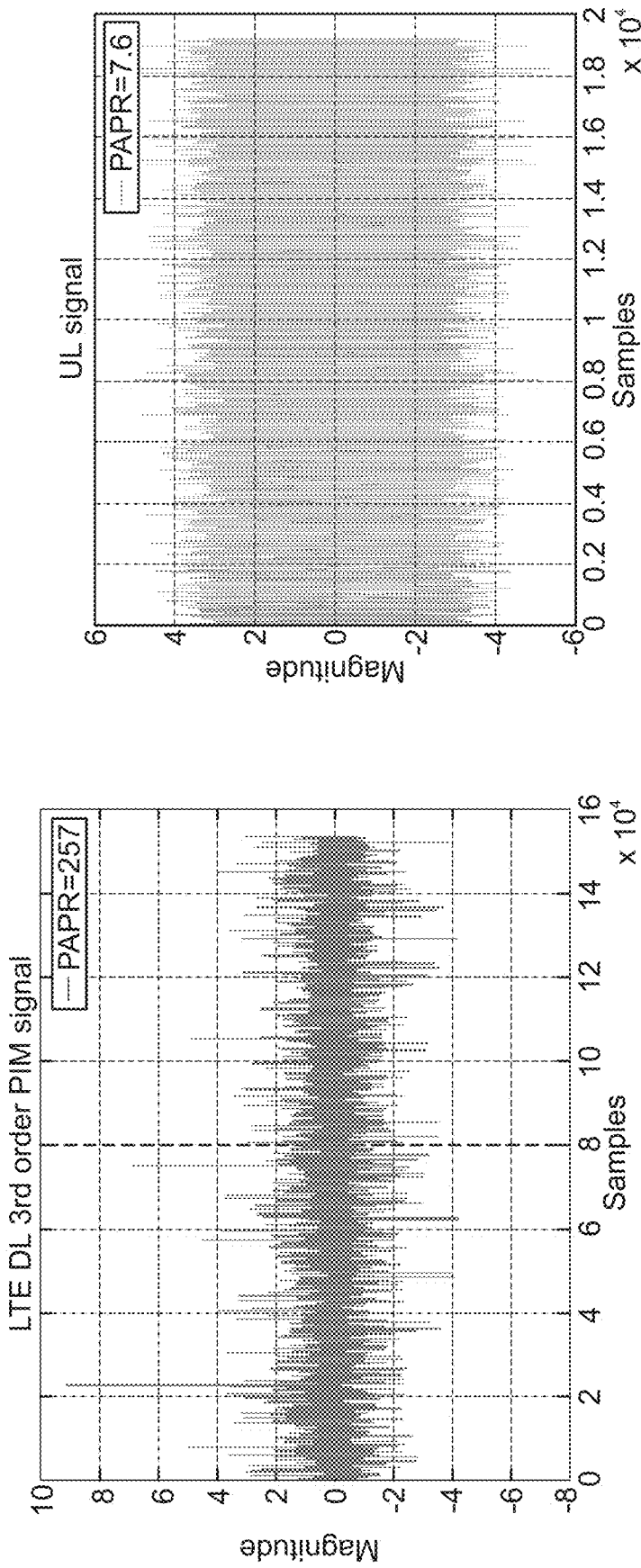
FIGS. 3 and 4 represent the real component in the time domain of an LTE downlink signal with a third order intermodulation signal and a corresponding uplink signal, respectively.

Peak-to-average power ratio is a metric that works well to distinguish intermodulation signals in an LTE uplink band. These intermodulation signals in the LTE uplink band are generated from signals in the downlink band. In LTE protocol, the downlink uses Orthogonal Frequency Division Multiple Access (OFDMA) and demonstrates large peak-to-average power ratio compared to the uplink signal. In the case of the intermodulation signal of the downlink, the peak-to-average power ratio gets even higher and easily discernible from the downlink signal. Thus, PAPR is a good statistic that can be used to identify the presence of inter-modulation signal in the downlink. The computation load in measuring this statistics is low and can be implemented in any DSP or embedded processor. FIGS. 3 and 4 illustrate time domain representation of the real component of a third order intermodulation signal in the downlink and a corresponding uplink signal, respectively.

i. Method to Identify Interference with PAPR

Figure 2:
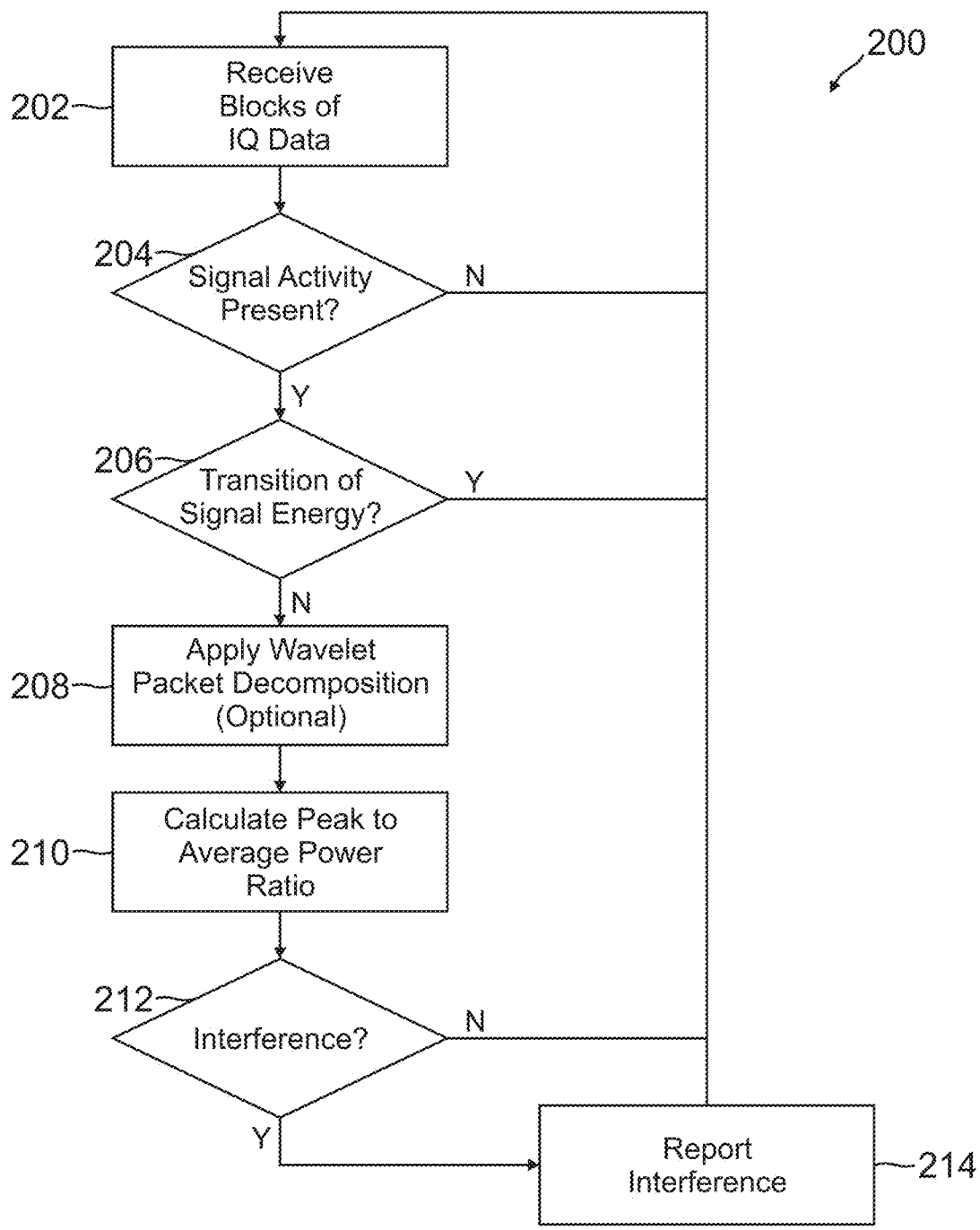
FIG. 2 is flow chart of one embodiment for a process for detecting interference based on peak-to-average power ratio of a received signal according to one aspect of the present invention.

FIG. 2 is flow chart of one embodiment for a process 200 for detecting interference based on peak-to-average power ratio (PAPR) of a received signal according to one aspect of the present invention. The process 200 begins at block 202 by receiving blocks of IQ data, e.g., IQ data from the front-haul communication link 112. At block 204, the process determines if signal activity is present. If no signal activity is present, the process returns to block 202 and processes the next blocks of IQ data. If signal activity is present, the process 200 determines if the IQ data corresponds to a transition of signal energy. The transition of signal energy from the thermal noise level to any activity level may demonstrate PAPR which is not due to interference but rather is due to a temporal transition of the signal. The thermal noise level can be calculated by observing the time domain signal activity for a long observation time and finding the lowest mean for a moving average window. If received signal is r(n), n is the discrete Inphase or quadrature samples, then a window of length of L samples will be searched which is free of temporal transition and PAPR will be measured on that block at block 210.

$$s(k)_{k=0}^{L} = f(r(n))$$

Where, $f$ is a function to find segments of L samples with no temporal transition within the r(n) received samples. There could be a number of non-contiguous segments such as s(k) of L samples.

PAPR, M of signal s(k), $$M = \frac{\max\{\|s(k)\|^2\}}{E[s(k)^2]}$$

ii. Measuring PAPR when Interfering Signal is Close to Noise Floor

In a receiver at remote radio head 106, the interfering signal power can be close to the thermal noise power. For the case of a downlink intermodulation signal, it is understood that a good majority of the time the intermodulation signal will be close to the thermal noise floor. In those cases, the PAPR of the signal is a good aide to identify the presence of the interference signal. When the signal power of a high PAPR interfering signal at the receiver is close to the thermal noise power of the receiver, directly measuring the PAPR of the signal, as described above, will not show high PAPR values. To overcome this problem, additional wavelet signal processing techniques are applied at optional block 208 prior to calculating the PAPR at block 210 to detect the presence of a signals with a high peak-to-average power ratio.

iii. Applying Wavelet to Extract PAPR

At block 208, in one embodiment, a special signal processing technique, known as de-noising, is optionally applied to the windowed samples, mentioned above to better detect the presence of a high PAPR signal. The de-noising can be performed by wavelet packet decomposition of the signal by using a wavelet function, thresholding the details (upper band node components), and reconstructing the signal with the wavelets. For a passive intermodulation signal in a downlink LTE band, it has been discovered that using a Symlet wavelet of order 6 (support width 11), is able to detect the multicarrier induced peak signal when signal power is close to thermal noise floor. Other wavelet signals, such as Daubechies could be applied to other waveforms to detect presence of high signal to average power ratio.

Figure 6:
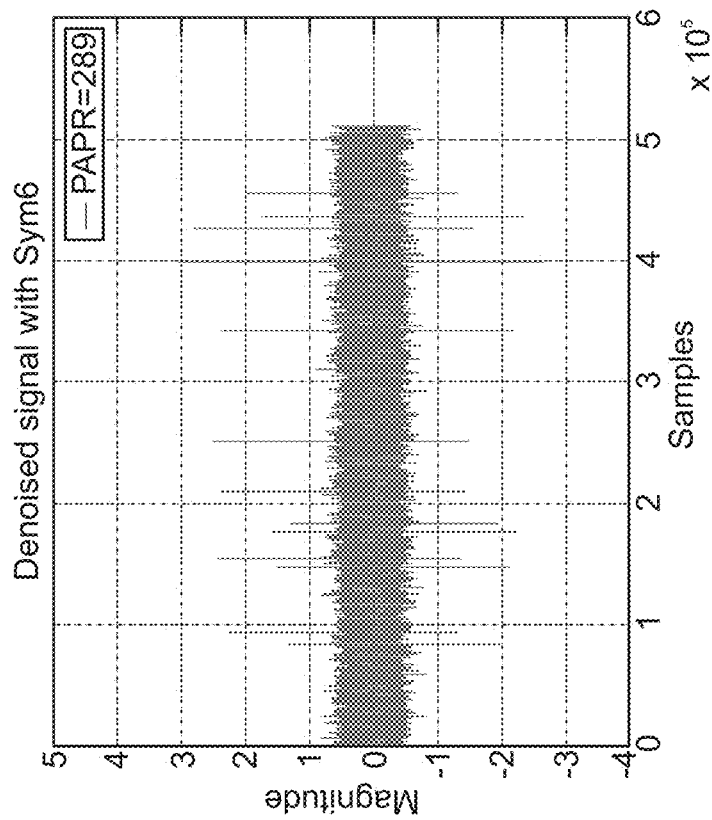
FIG. 6 represents the signal of FIG. 5 after applying a de-noising function according to one aspect of the present invention.
Figure 5:
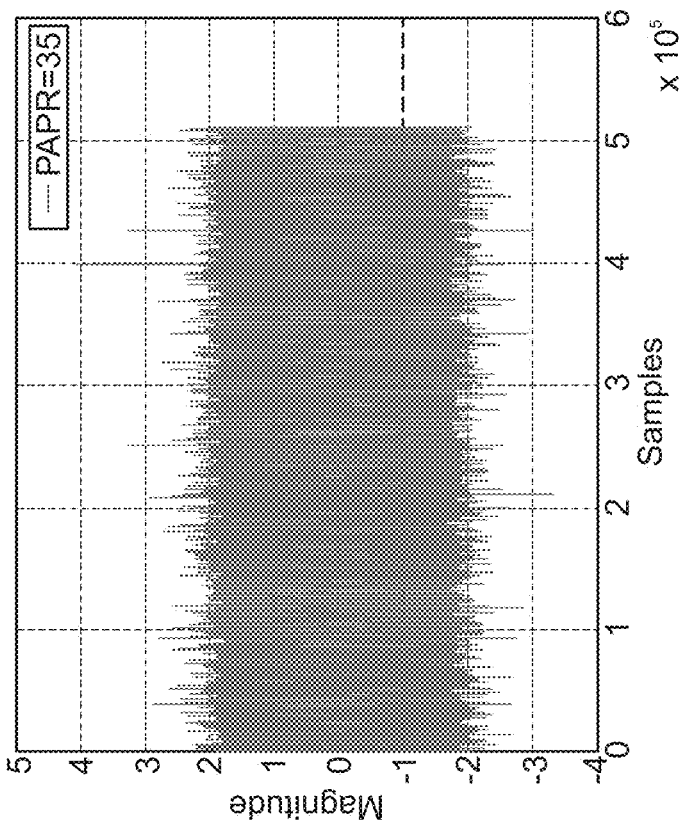
FIG. 5 represents a real component in the time domain of an LTE downlink signal with a third order intermodulation signal with a power level that is similar to the power level of thermal noise.

FIG. 5 plots the real samples in a receiver when a downlink intermodulation signal is received as an interferer with the same power level as of the thermal noise in the presence of the uplink signal. The PAPR measurement of the signal is low since the average noise signal is high. However, if de-noising is applied on the signal at block 208, the PAPR measured at block 210 grows to a high number as shown in FIG. 6.

At block 212, process 200 determines if an interference signal is present based on the calculated PAPR. For example, in one embodiment, the calculated PAPR is compared to a threshold. In the case of the downlink of an LTE system, the peak-to-average power ratio for a downlink signal going through a non-linearity can be more than 100 depending on the order of the non-linearity. If it is determined that an interference signal is present, process 200 reports the interference signal at block 214. Otherwise, the process returns to block 202 to process the next blocks of IQ data.

B. Measuring Kurtosis

Another metric that can be used to help identify interfering signals is Kurtosis. Measuring the fourth order moment can reveal the presence of interference in the desired signal which is not visible through spectrum inspection. When an uplink signal is Gaussian and the interfering signal is non-Gaussian or vice versa, then Kurtosis would be a good measure to detect the presence of an interfering signal. For example, if the uplink signal is a Wideband Code Division Multiple Access (WCDMA) signal which is noise-like and the interfering signal is LTE, then kurtosis can be used to identify the interfering signal.

Figure 7:
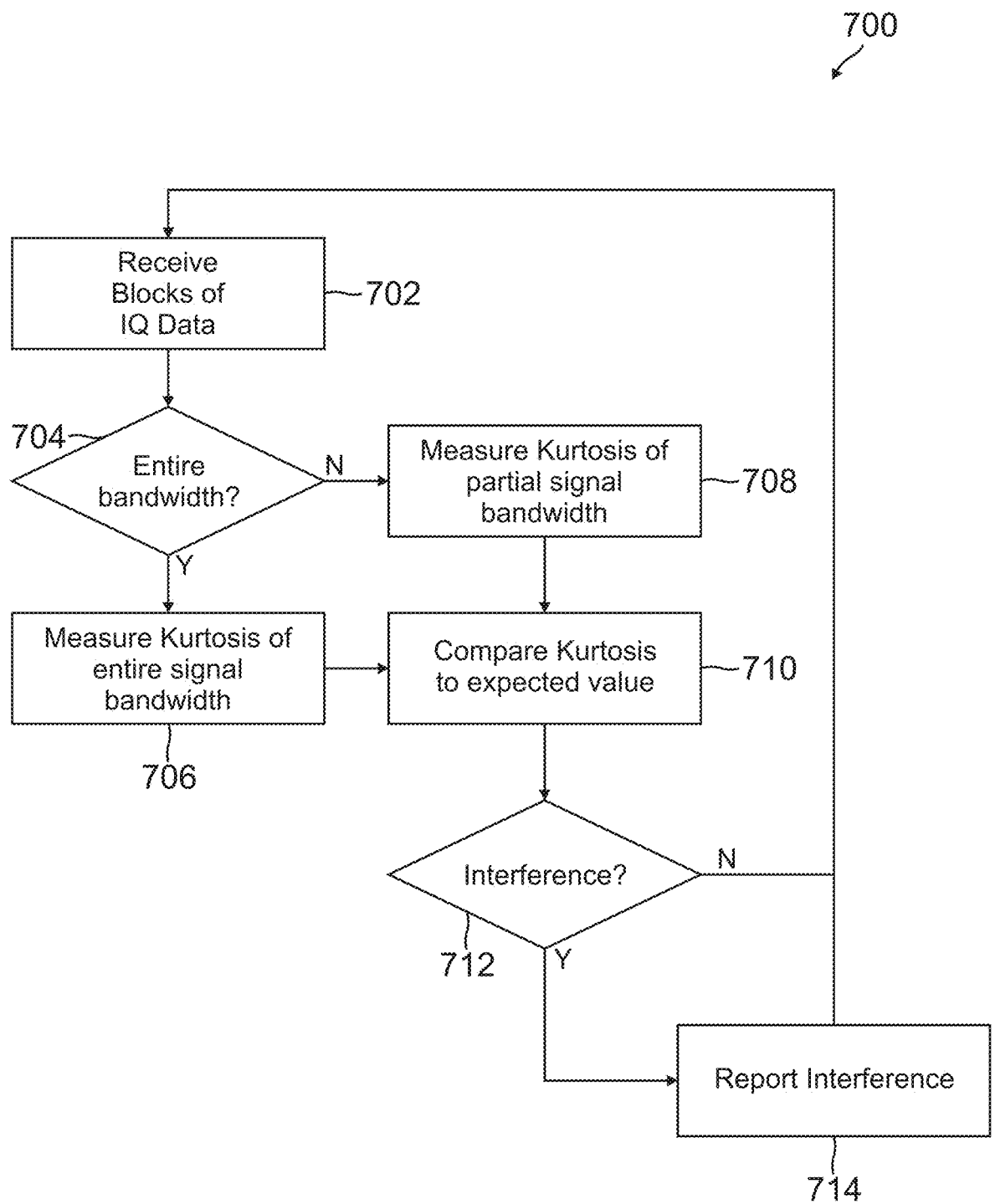
FIG. 7 is a flow chart of one embodiment of a process for detecting interference based on kurtosis of a received signal according to one aspect of the present invention.

FIG. 7 is a flow chart of one embodiment of a process 700 for detecting interference based on kurtosis of a received signal according to one aspect of the present invention. At block 702 blocks of IQ data are received from a remote radio head 106 over the front-haul communication link 112 (e.g., CPRI interface). For kurtosis analysis it is not necessary that the signal of interest or interferer has to be Gaussian.

In process 700, Kurtosis will be measured on the desired uplink signal either on the entire signal bandwidth or on the partial bandwidth depending on the signal of interest and suspected interferer, e.g., if the signal of interest or the suspected interferer has a narrow bandwidth. At block 704, it is determined whether Kurtosis is applied to the entire signal band or a partial signal band. Kurtosis is applied to the entire signal bandwidth at block 706 or the partial bandwidth at block 708. At block 710, the Kurtosis calculation is compared to an expected value to determine if an interfering signals is present. If the desired uplink is noise like it will be compared to the kurtosis of a normal distribution—The kurtosis of a signal with normal distribution is 3. In another embodiment, the kurtosis of the desired signal without the presence of any interference is determined and then compared, at block 712, with the result of block 710 to see if any discrepancy exists. The discrepancy will indicate the presence of interference. If interference is detected at block 712, it is reported at block 714.

2. Identification of Unique Cyclic Frequency

A second general technique for identifying an interfering signal involves detecting interfering signals with a cyclic signature. The underlying principle of this method assumes that the interfering signal is cyclostationary in nature, meaning that the statistical parameters of the interfering signal varies with single or multiple periodicities. This cyclostationary attribute is reflected in the second order moments of the signal and can be interpreted in terms of the property that enables generation of spectral lines by putting the received signal through a non-linear transformation. It should be noted here that in some embodiments the desired wireless signal will also demonstrate cyclostationary properties due to symbol rate, keying rate, pilot patterns, and modulation techniques. The cyclic frequencies of the desired signal can be known a priori and any other periodicities or cyclic frequencies observed can be attributed to the presence of an undesired signal or interference signal. To detect the presence of the interfering signal, embodiments of the present invention use signal processing functions, namely a Cyclic Autocorrelation function (CAF) and/or a Spectral Correlation Density (SCD), which is discussed briefly here. These signal processing functions are applied to the received signal to identify any cyclic interfering signal in the received frequency band, e.g., the uplink band at a remote radio head 106 in a distributed base station system 102.

A. Measuring Unique Cyclic Frequency

A signal or random process, x(t), is said to be cyclostationary in the wide sense when its mean and autocorrelation are periodic with some period, e.g., T.

Hence, the mean and auto correlation of x (t) are given in equations (2) and (3) respectively, $$m_x(t+T) = m_x(t) \quad (2)$$

$$R_x\left(t+T+\frac{\tau}{2}, t+T-\frac{\tau}{2}\right) = R_x\left(t+\frac{\tau}{2}, t-\frac{\tau}{2}\right) \quad (3)$$

From the above, it is understood that for some delay product signal $$x\left(t-\frac{\tau}{2}\right)x\left(t+\frac{\tau}{2}\right)$$

the PSD will show spectral lines at some non-zero frequencies, $\alpha \neq 0$. The cyclic autocorrelation function can be written as $$R_x^\alpha(\tau) = \sum_{-\infty}^{\infty} x\left(t-\frac{\tau}{2}\right)x^*\left(t+\frac{\tau}{2}\right)e^{-j2\pi\alpha t} \quad (4)$$

The Fourier transform of the Cyclic Autocorrelation function is called the Spectral Correlation Density (SCD).

$$S_x^\alpha(f) = \sum_{\tau=-\infty}^{\infty} R_x^\alpha(\tau)e^{-j2\pi f\tau} \quad (5)$$

i. Interference Identification

The I/Q data extracted from the front-haul communication link 112 (e.g., CPRI or any other interface) will undergo a Cyclic Autocorrelation Function.

The detection decision in general can be described under the test of the following two hypotheses.

$H_0$: $y[n]=x[n]+g[n]$ only desired signal present
$H_1$: $y[n]=x[n]+g[n]+I[n]$ Desired signal present and an unknown interference present Where y[n] is the received signal samples and x[n] is the transmitted signal, g[n] is the white Gaussian noise and I[n] is the interference. At hypothesis $H_0$ the probability of detection of a cyclic frequency which cannot be attributed to the desired signal or cannot be matched with the known characteristics of the signal is the probability of false alarm. At hypothesis $H_1$, the probability of detecting a cyclic frequency that cannot be attributed to the desired signal or cannot be matched with the known spectral correlation is the probability of detection of the interfering signal.

Figure 8:
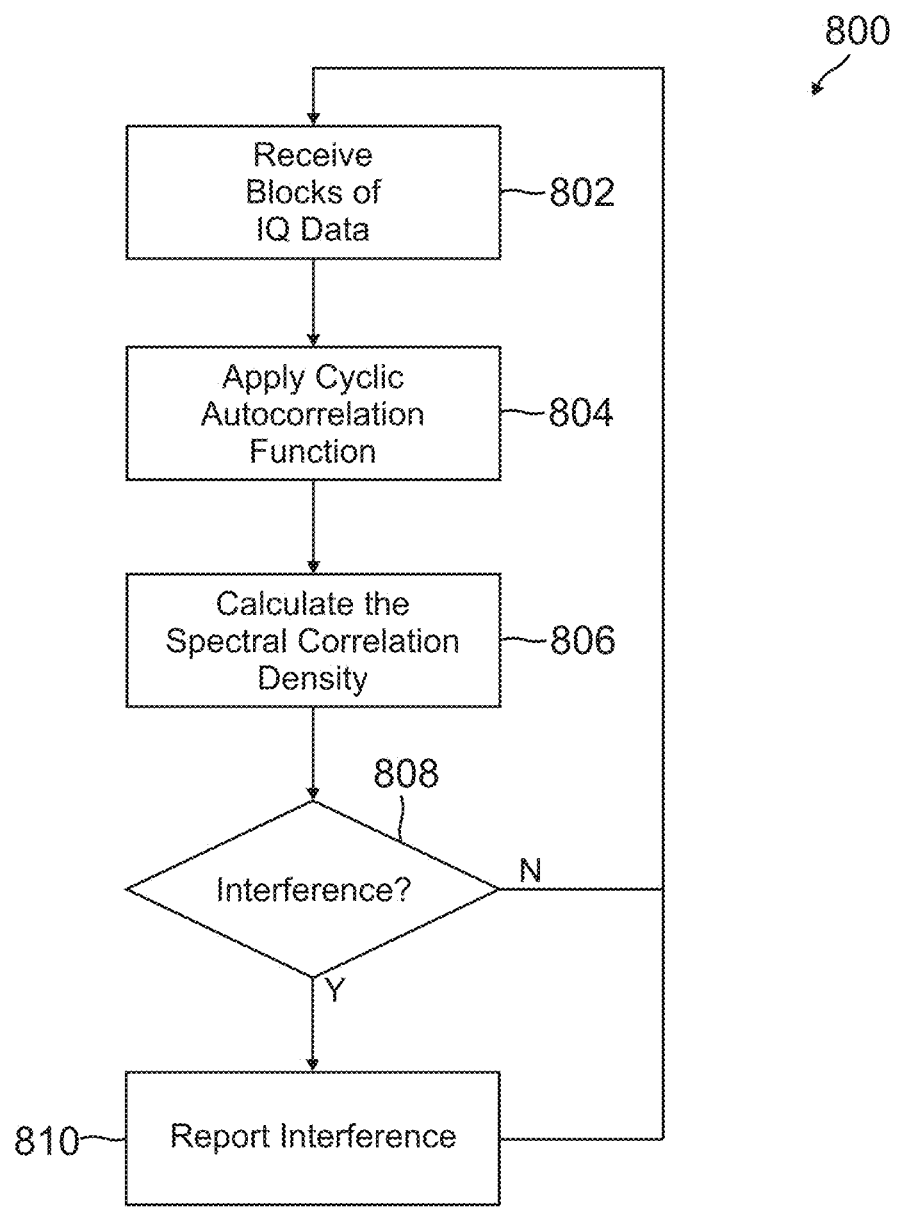
FIG. 8 is a flow chart of one embodiment of a process for detecting interference based on a cyclic frequency of the interfering signal according to one aspect of the present invention.

FIG. 8 is a flow chart of one embodiment of a process 800 for detecting interference based on a cyclic frequency of the interfering signal according to one aspect of the present invention. Process 800 begins at block 802. At block 802 blocks of IQ data are received from the remote radio head 106 at tester 100 over front-haul communication link 112. At block 804, a cyclic autocorrelation function is applied to the IQ data. At block 806, a spectral correlation density is applied to the IQ data. At block 808, a determination is made as to whether an interfering signal has been identified. If an interfering signal is identified this is reported at block 810.

ii. Example of Universal Mobile Telecommunications System (UMTS) Signal

Figure 10:
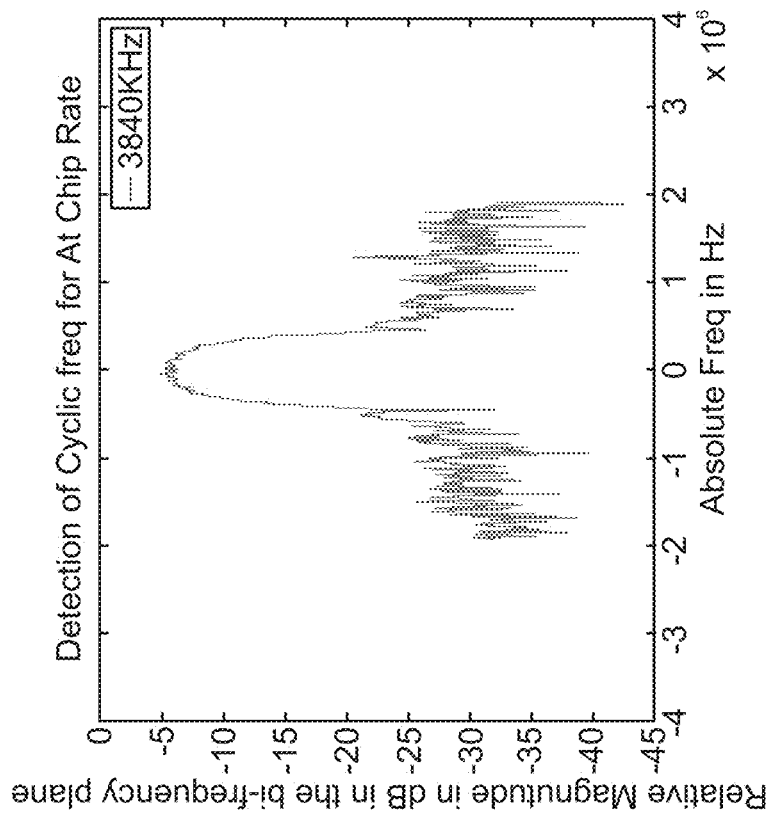
FIGS. 9 and 10 illustrate the cyclic autocorrelation function and spectral correlation density of a UMTS signal.
Figure 9:
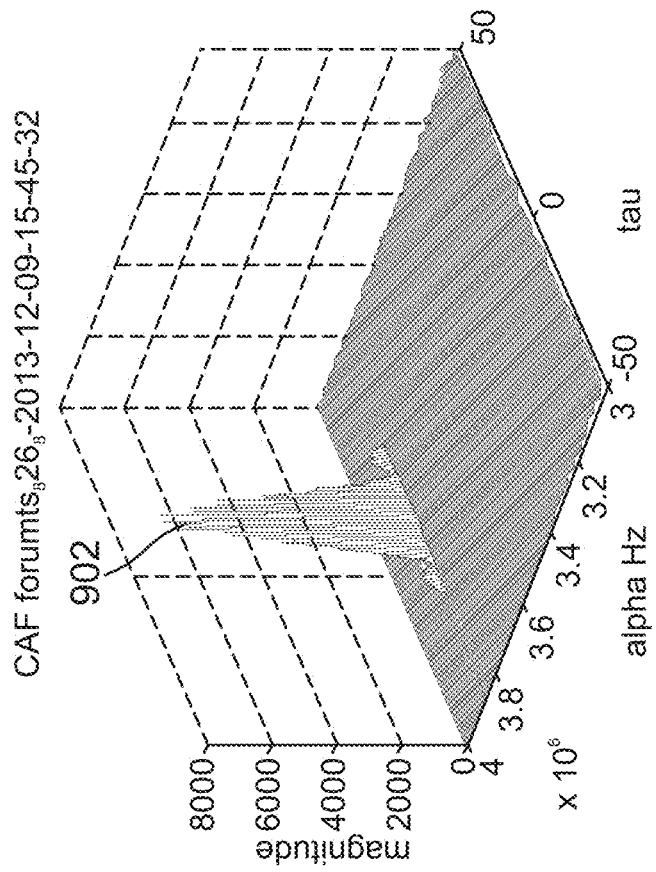

UMTS signals will mostly demonstrate cyclic frequency due to the chip rate or the uplink pilot which repeats every frame. Both the CAF function and the SCD could be applied to detect the chip rate and frame rate cyclic frequency. FIG. 9 and FIG. 10 show both the CAF and SCD, respectively, with a peak (902 in FIG. 9) at the chip rate for the UMTS signal.

iii. Example of Interference Identification with CAF

Figure 11:
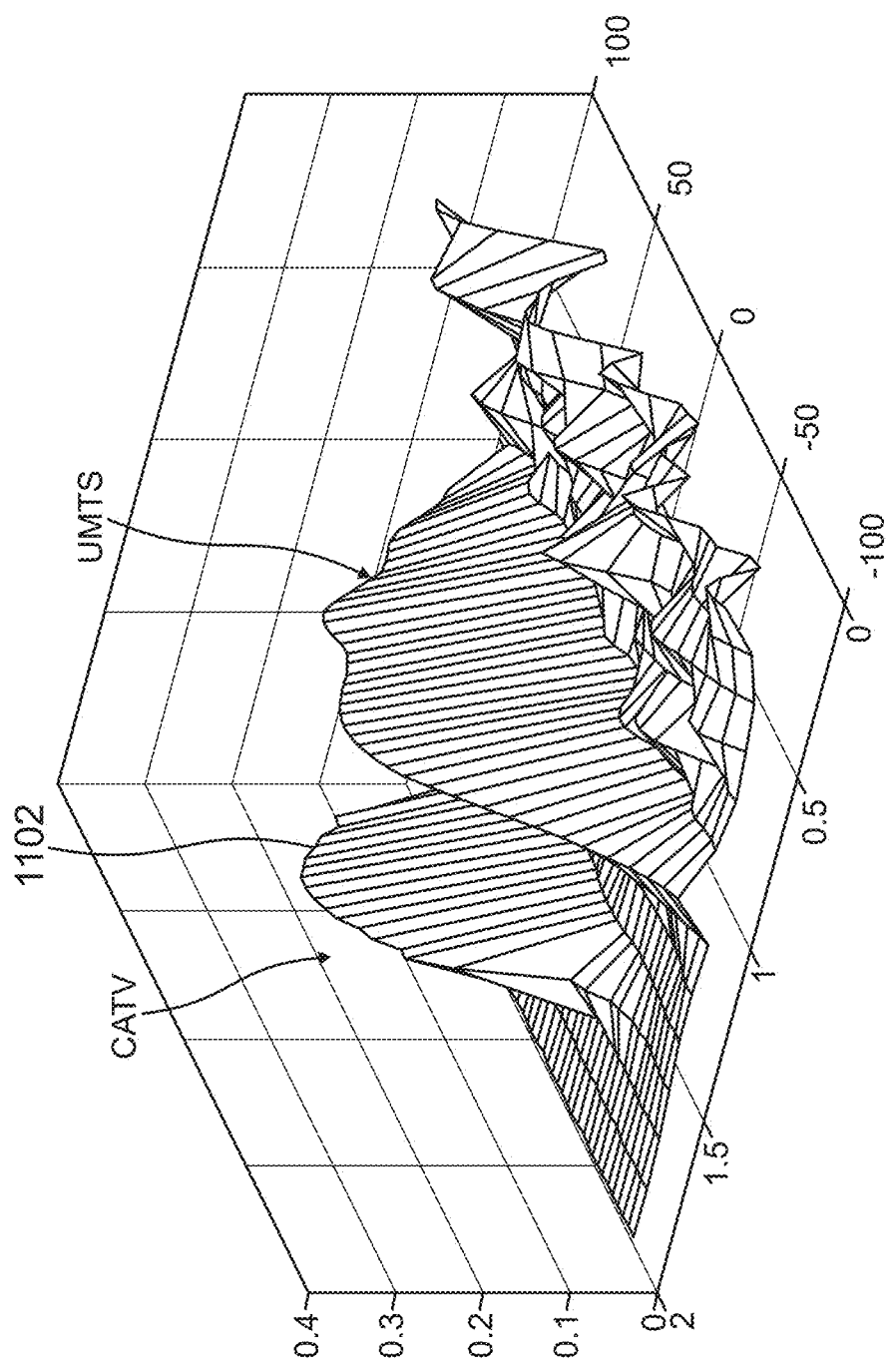
FIG. 11 illustrates a cyclic autocorrelation function output for a UMTS signal corrupted by a CATV signal.

The CAF can be evaluated in some cases where a certain discrete frequency is searched over a certain bandwidth of the signal. For an example, if a UMTS signal has a low power CATV interferer then the potential keying rate/data rate of the CATV, 6 MHz, can be evaluated to see if there is any cyclic presence of that particular rate as shown at 1102 in FIG. 11.

3. Spectral Estimation

A. Spectral Bandwidth Shape Identification

Spectral estimation is another technique that can be used to identify an interfering signal in a wireless system such as distributed base station 102. Spectral estimation can be applied to detect the presence of an interfering signal which does not represent the spectral shape of the signal of interest. As an example, for the LTE protocol, if a signal is detected spanning a bandwidth other than one resource block (RB), it could be considered as an interferer. With LTE, the bandwidth of an uplink signal assignment is usually a multiple of a single resource block (e.g., 180 kHz). For spectral estimation, the LTE signal spectral output will be averaged with proper time alignment with an LTE subframe. This technique allows estimating the interfering signal that is consistent in the time domain to rise above the randomly assigned resource block assignment.

B. Spectral Estimation for PIM Test

In one embodiment, tester 100 applies a spectral estimation technique to identify intermodulation signals created by two tones to improve detection accuracy. Application Ser. No. 62/297,392 describes an embodiment of a Passive Intermodulation (PIM) Tester that implements a two-tone PIM test (the '392 Application). The '392 Application is incorporated herein by references. The system described in the '392 Application works in ideal conditions when there is no disturbance in the receive band around the expected PIM signal. However, because of the existence of other signals in the field, there will be cases where the PIM signal may not be detected or where interfering signals could complicate the ability of the PIM tester to positively establish the presence of PIM. The simple spectral estimation technique as described above are used in one embodiment to autonomously and positively establish the presence of a PIM signal that is at least partially masked by some other signal.

i. Autonomous PIM Detection

Figure 12A:
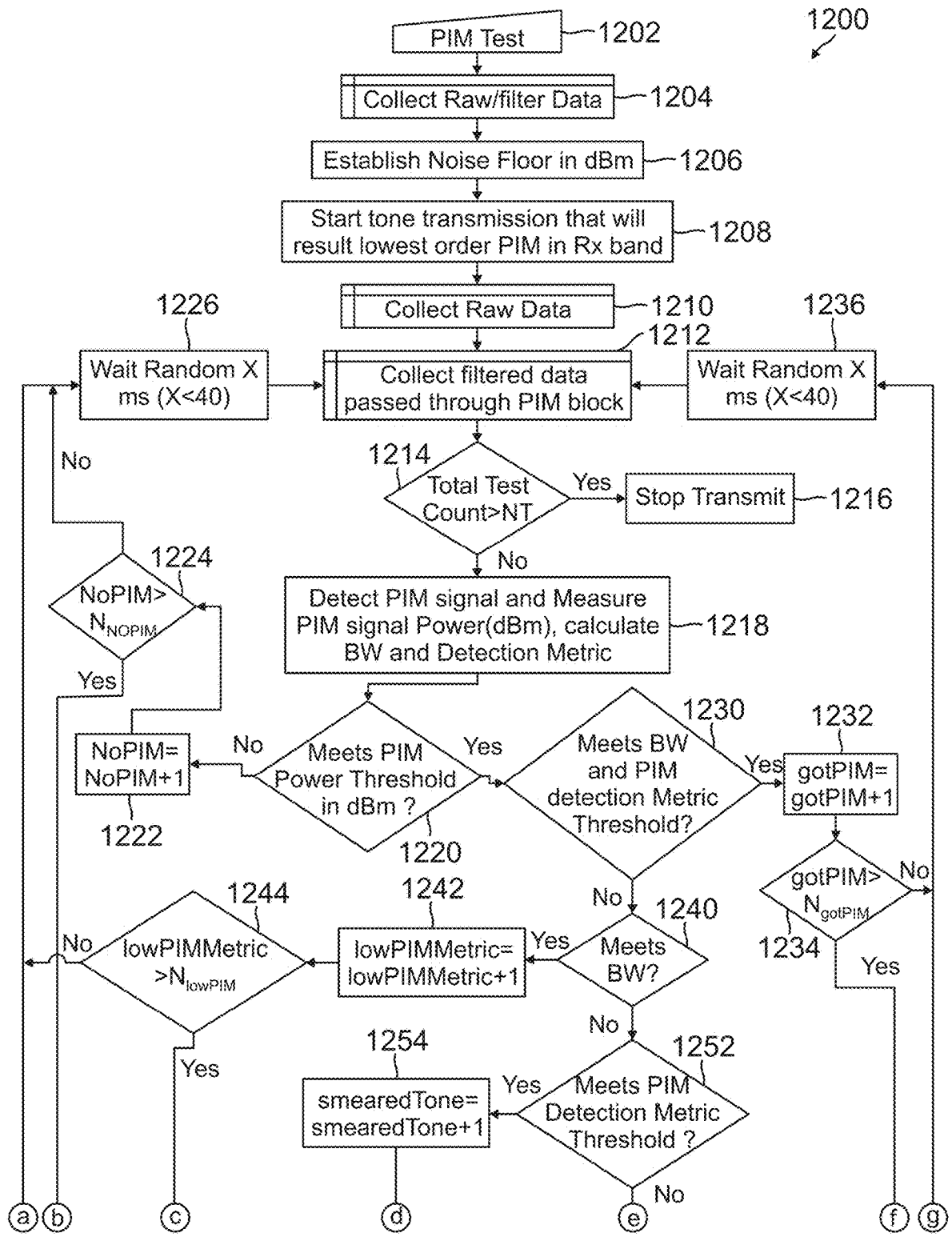
FIGS. 12A and 12B illustrate a flow chart of a process for using spectral estimation to identify an interfering signal according to one embodiment of the present invention.
Figure 12B:
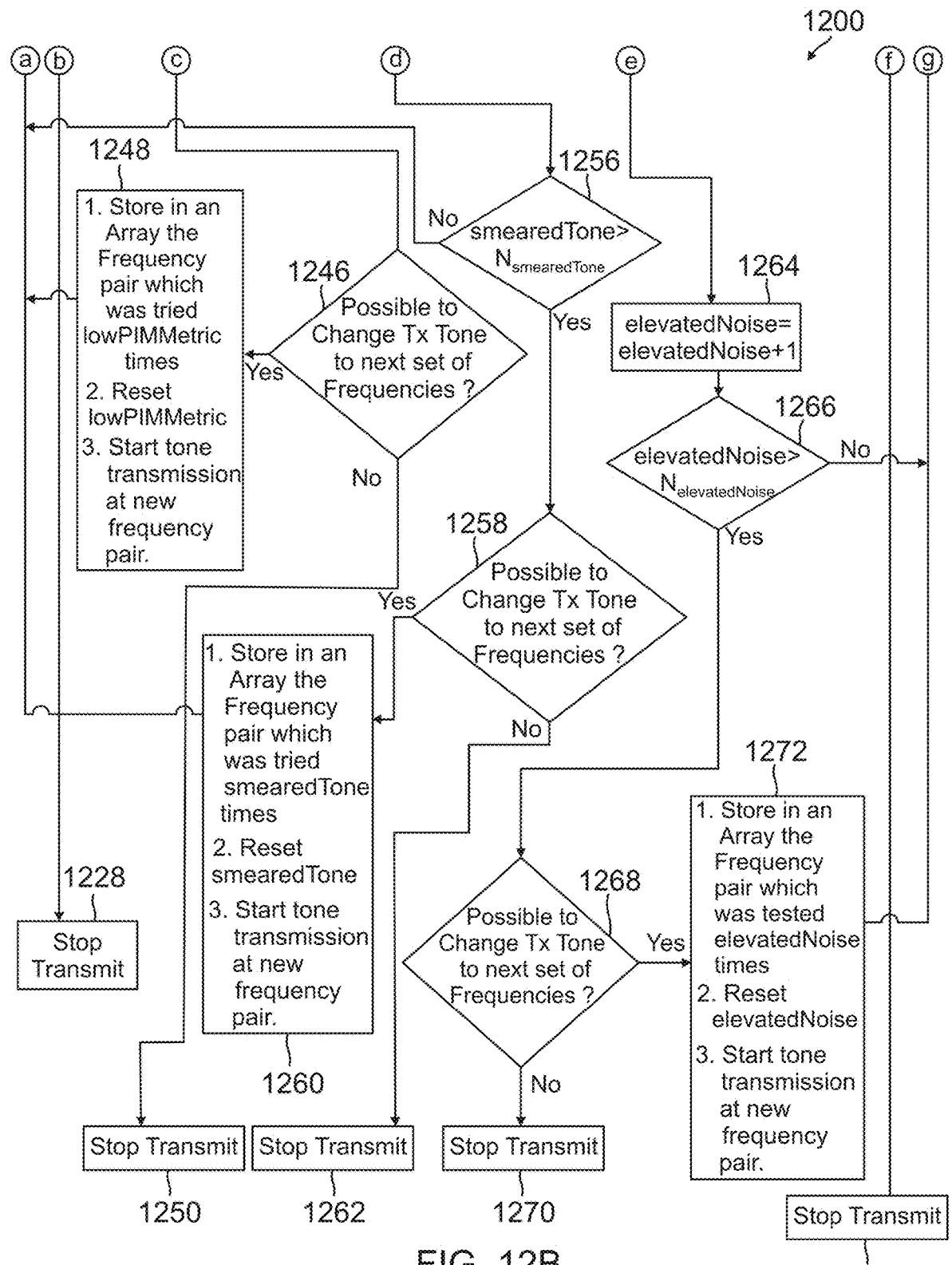

FIGS. 12A and 12B illustrate a flow chart of a process for using spectral estimation to identify a passive intermodulation signal according to one embodiment of the present invention. If the receive (uplink) band has only white noise it is fairly easy to reach a conclusion with high confidence of whether PIM exists or not. It becomes quite challenging if the noise is colored or there is presence of other interferers in the network especially when there is no knowledge of the receiver characteristics, e.g. the characteristics of remote radio head 106. The flowchart of FIGS. 12A and 12B will gather a set of analysis metrics which can be used to reach a more informed decision regarding the presence of PIM. In one embodiment, these analyses metrics are made available as an output to a user. In other embodiments, the metrics are processed by an algorithm which makes a binary decision at the end.

The method begins at block 1202 and performs a PIM test by launching selected tones in the downlink from remote radio head 106 such as described in the '392 Application. At block 1204, tester 100 collects raw IQ data from the fronthaul communication link 112.

(1). Establish Noise Floor

At block 1206, process 1200 establishes a noise floor. During this time, the cell under test is barred and there should be no user equipment trying to attach to distributed base station 102. However, due to frequency reuse in LTE systems, transmission from user equipment camped on adjacent cells could disturb the channel under test in distributed base station 102.

Process 1200 computes the ambient noise floor power in the received channel by observing the spectrum and searching for floor free of any disturbance. In this method, tester 100 will not transmit any signal but will only capture raw or filtered data. The floor free of any signal will be equated to the theoretical thermal noise to establish absolute signal power. Note that the noise floor of the receiver can be assumed or could be applied based on model number/make of the RRU manufacturer.

Before moving on to describe the balance of FIGS. 12A and 12B, some information about the framework of process 1200 is provided.

(2) PIM Analysis Metrics

In the field condition, the goal is to collect as much analysis metrics as possible to reach a decision of whether PIM exists or not. The procedure mentioned in the flowchart of FIGS. 12A and 12B allows repeating a set of tests several times and saves the history of the data from these tests.

(a) Counter

In FIGS. 12A and 12B, each path is associated with a counter which is correlated with the outcome of the test.

(b) Detection Metrics

In FIGS. 12A and 12B, three different detection metrics will be captured. These metrics include PIM tone power, and the standard deviation and mean of the noise floor around the expected PIM tone.

i. PIM Tone Power in dBm

PIM tone power will be calculated based on the reference power of the noise floor.

ii. Standard Deviation and Mean of the Noise Floor

The complex spectral output will be analyzed for peaks around the expected PIM tone. The search area could be ±0.5 KHz around the expected PIM tone. The standard deviation and mean of the noise floor will be calculated in the vicinity of the expected tone. The following metrics will be calculated.

$$detMetric1 = 10*\log 10(peak/mean(noise))$$

$$detMetric2 = 10*\log 10((peak-mean)/std(noise))$$

iii. Bandwidth of Detected Signal

The bandwidth of the detected PIM signal will be analyzed by looking at the power slope around the peak. For an ideal tone, the peak power falls sharply in adjacent bins. Bandwidth will be calculated by measuring the power differential on both sides of the peak.

(3) Random Delay in Test

In one aspect of process 1200, a random delay is inserted between sequential tests thereby circumventing any transmitter/disturbance which exhibits periodic behavior.

(4) Change Tx Tone Frequency

Once a set of frequencies are tested but no conclusive decision can be reached, the test can switch to a new set of frequencies, if available. In absence of a new set of frequencies for the lowest order inter-modulation product under test, the next set of higher order products can be used. In one embodiment, when changing frequency, the target is to land on an inter-modulation product which is farthest from the previous inter-modulation product under test.

(5) Decision Thresholds

FIGS. 12A and 12B mention three distinct decision thresholds for performing the tests. These thresholds are based on data points available from lab test and existing literature. In addition, in one embodiment, these thresholds are calibrated based on collected data from a barred cell in a live network.

i. PIM Power Threshold—Based on some analysis and literature survey it will be close −120 dBm ii. Detection Metric Threshold—To distinguish a signal visually from the floor below at least 7 dB and 12 dB is needed for detMetric1 and detMetric2 respectively for in an additive white Gaussian noise channel.

iii. PIM BW Threshold—For the PIM loads tested in the lab and with the Hanning window function used, the threshold is around 250 Hz.

Returning to FIG. 12A, at block 1208 tester 100 starts transmitting tones that will result in the lowest order PIM signal in the uplink band at RRH 106. Tester 100 continues to transmit test tones in parallel with the balance of the method of FIGS. 12A and 12B. As discussed in more detail below, the frequency of the test tones may be changed from time to time. Raw data is collected at block 1210 from the IQ data in the front-haul communication link 112 between RRH 106 and BBU 104. At block 1212, the data is filtered.

At block 1214, process 1200 determines whether the total test count exceeds the threshold number of test (NT). If so, process 1200 stops transmit at block 1216. If not, the process 1200 proceeds to block 1218 and detects the PIM signal, measures the PIM signal power in dBm and calculates the bandwidth, standard deviation and mean of the noise floor as defined above.

At block 1220, process 1200 tests to determine whether the expected PIM tone meets the PIM power threshold. If not, process 1200 increments the counter NoPIM at block 1222. At block 1224, the process 1200 checks to see if the NoPIM counter exceeds a threshold ($N_{NoPIM}$). If so, process 1200 proceeds to block 1226 and waits a random amount of time as discussed above. If the counter NoPIM exceeds the threshold, process 1200 determines that there is no PIM signal and stops transmission at block 1228.

If at block 1220, process 1200 determines that the expected PIM tone exceeds the power threshold, the process moves to block 1230 and tests the bandwidth and PIM detection metrics. If at block 1230, process 1200 determines that the metrics indicate the presence of PIM, the process increments a counter gotPIM at block 1232. If the current value of gotPIM exceeds a threshold ($N_{gotPIM}$), the process determines that there is a PIM tone present and stops transmit at block 1238. Otherwise, if gotPIM does not exceed the threshold, the process returns to block 1236 and waits a random amount of time as described above.

If at block 1230, the expected PIM tone does not meet the bandwidth threshold and PIM detection metrics, process 1200 moves to block 1240 and determines if the expected PIM tone meets the bandwidth threshold. If so, process 1200 moves to block 1242 and increases the counter lowPIM-Metric indicating that the expected PIM tone does not meet the PIM detection metrics. At block 1244, process 1200 determines whether the current value of the lowPIMMetric exceeds a threshold ($N_{lowPIM}$). If not, process 120 proceeds to block 1226 and waits a random time before the next test. If, however, the current value of lowPIMMetrics exceeds the threshold, process 1200 proceeds to block 1246 and determines if it is possible to change the transmit tone to a next set of frequencies. If so, process 1200 stores the frequency pair which was used in the test, the value of the lowPIM-Metric counter, resets the counter, and starts tone transmission at a new frequency pair at block 1248 and returns to block 1226. If no additional frequency sets are available, process 1200 stops transmission at 1250.

If at block 1240, process 1200 determined that the potential PIM tone did not meet the bandwidth threshold, process 1200 moves on to block 1252. At block 1252, process 1200 determines if the expected PIM tone meets the PIM detection metric threshold. If so, process 1200 increments the counter smearedTone at block 1254. At block 1256, process 1200 determines whether the smearedTone counter exceeds a threshold ($N_{smearedTone}$). If not, process 1200 proceeds to block 1226 and waits a random amount of time to move on to the next test. If, however, at block 1256, process 1200 determines that the smearedTone counter exceeds the threshold, process 1200 proceeds to block 1258 and determines if it is possible to change the transmission tone to a next set of frequencies. If not, process 1200 stops transmission at block 1262. If so, process 1200 stores the frequency pair which was used in the test, the value of the smearedTone counter, resets the smearedTone counter, and starts tine transmission at a new frequency pair at block 1260 and returns to block 1226.

If at block 1252, process 1200 determined that the expected PIM tone did not meet the PIM detection metric thresholds, the process moves on to block 1264. At block 1264, process 1200 increments the counter elevatedNoise. At block 1266, process 1200 determines if the counter elevatedNoise exceeds a threshold ($N_{elevatedNoise}$). If not, the process returns to block 1236 and waits a random amount of time for the next test. If the elevatedNoise counter does exceed the threshold, process 1200 determines if it is possible to change the transmit tone to a next set of frequencies at block 1268. If not, the process ceases transmitting at block 1270. If so, the process stores the frequency pair and the value of the elevatedNoise counter. The value of the elevatedNoise counter is also reset, and the process starts tone transmission at a new frequency pair at block 1272. The process returns to 1236 and waits a random amount of time for the next test.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs) or Field Programmable Gate Arrays (FGPAs).

EXAMPLE EMBODIMENTS

Example 1 includes a method for detecting interference in a wireless system, the method comprising: receiving an uplink signal at a remote radio head in a distributed base station; passing the uplink signal from the remote radio head to a baseband unit over a front-haul communication link as baseband IQ data; intercepting the baseband IQ data at a tester coupled between the remote radio head and the baseband unit; calculating a signal statistic for the uplink signal from the baseband IQ data; and determining whether an interfering signal is present based on the signal statistic.

Example 2 includes the method of example 1, wherein calculating a signal statistic comprises calculating a peak-to-average power ratio.

Example 3 includes the method of example 2, and further de-noising the baseband IQ data prior to calculating the peak-to-average power ratio.

Example 4 includes the method of example 3, wherein the de-noising comprises applying a wavelet packet decomposition to the baseband IQ data.

Example 5 includes the method of example 2, and further comprising: determining if there is signal activity present in the baseband IQ data; determining whether the determined signal activity corresponds to a transition in signal energy; and when the determined signal activity corresponds to a transition, omitting the calculation of peak to average power ratio for the baseband IQ data.

Example 6 includes the method of any one of examples 1-5, wherein calculating a signal statistic comprises calculating a kurtosis value from the baseband IQ data.

Example 7 includes the method of example 6, wherein calculating the kurtosis value comprises calculating the Kurtosis value on an entire signal bandwidth.

Example 8 includes the method of example 6, wherein calculating the kurtosis value comprises calculating the Kurtosis value on a partial signal bandwidth.

Example 9 includes the method of example 6 and further comprising comparing the calculated kurtosis value with an expected value to determine whether an interfering signal is present.

Example 10 includes a method for detecting interference in a wireless system, the method comprising: receiving an uplink signal at a remote radio head in a distributed base station; passing the uplink signal from the remote radio head to a baseband unit over a front-haul communication link as baseband IQ data; intercepting the baseband IQ data at a tester coupled between the remote radio head and the baseband unit; applying a non-linear transformation to the baseband IQ data; and determining whether an interfering signal is present based on the results of the non-linear transformation of the baseband IQ data.

Example 11 includes the method of example 10, wherein applying a non-linear transformation comprises applying one or more of a cyclic autocorrelation function to the baseband IQ data and calculating the spectral correlation density for the baseband IQ data.

Example 12 includes a method for detecting passive intermodulation (PIM) interference in a wireless system, the method comprising: transmitting tones in a downlink channel at a remote radio head of a distributed base station; receiving an uplink signal at the remote radio head in the distributed base station; passing the uplink signal from the remote radio head to a baseband unit over a front-haul communication link as baseband IQ data; intercepting the baseband IQ data at a tester coupled between the remote radio head and the baseband unit; applying spectral estimation to the baseband IQ data around an expected PIM interferer; and determining whether the expected PIM interferer is present based on the spectral estimation for the baseband IQ data.

Example 13 includes the method of example 12, and further comprising establishing a noise floor of the distributed base station.

Example 14 includes the method of example 13, wherein applying spectral estimation comprises gathering a set of an analysis metrics including power in the expected PIM interferer, a standard deviation and mean of the noise floor, and a bandwidth of the expected PIM interferer.

Example 15 includes the method of example 14, and further comprises testing the distributed base station by repeating the sending the tones in the downlink channel of the remote radio head, the receiving the uplink signals and saving a history of the tests.

Example 16 includes the method of example 15, and further comprises inserting a random delay between sequential tests of the testing of the distributed base station.

Example 17 includes the method of any of examples 15 and 16, and further comprising: comparing at least one of the analysis metrics to an associated threshold; and updating one or more counters, each counter is correlated with a possible outcome of a test.

Example 18 includes a tester, comprising: at least one interface to communicatively couple the tester unit to a front-haul communication link used for communicating front-haul data to a remote radio head (RRH) having one or more antenna ports; a programmable processor, coupled to the interface, configured to execute software, wherein the software is operable to cause the tester to do the following: intercept baseband IQ data received from the remote radio head on the front-haul communication link; calculate a signal statistic for the uplink signal from the baseband IQ data; and determine whether an interfering signal is present based on the signal statistic.

Example 19 includes the tester of example 18, wherein calculate a signal statistic comprises calculating a peak-to-average power ratio.

Example 20 includes the tester of any of examples 18 and 19, wherein calculate a signal statistic comprises calculating a kurtosis value.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

The invention claimed is:

1. A method for detecting interference in a wireless system, the method comprising:
receiving an uplink signal at a remote radio head in a distributed base station;
passing the uplink signal from the remote radio head to a baseband unit over a front-haul communication link as baseband IQ data;
intercepting the baseband IQ data at a tester coupled between the remote radio head and the baseband unit;
calculating a signal statistic for the uplink signal from the baseband IQ data;
determining whether an interfering signal is present based on the signal statistic;

wherein calculating a signal statistic comprises calculating a peak-to-average power ratio;
and further de-noising the baseband IQ data prior to calculating the peak-to-average power ratio; and
wherein the de-noising comprises applying a wavelet packet decomposition to the baseband IQ data.

2. The method of claim 1, wherein calculating a signal statistic comprises calculating a kurtosis value from the baseband IQ data.

3. The method of claim 2, wherein calculating the kurtosis value comprises calculating the Kurtosis value on an entire signal bandwidth.

4. The method of claim 2, wherein calculating the kurtosis value comprises calculating the Kurtosis value on a partial signal bandwidth.

5. The method of claim 2 and further comprising comparing the calculated kurtosis value with an expected value to determine whether an interfering signal is present.

6. A method for detecting interference in a wireless system, the method comprising:
receiving an uplink signal at a remote radio head in a distributed base station;
passing the uplink signal from the remote radio head to a baseband unit over a front-haul communication link as baseband IQ data;
intercepting the baseband IQ data at a tester coupled between the remote radio head and the baseband unit;
calculating a signal statistic for the uplink signal from the baseband IQ data;
determining whether an interfering signal is present based on the signal statistic;
wherein calculating a signal statistic comprises calculating a peak-to-average power ratio; and further comprising:
determining if there is signal activity present in the baseband IQ data;
determining whether the determined signal activity corresponds to a transition in signal energy; and
when the determined signal activity corresponds to a transition, omitting the calculation of peak to average power ratio for the baseband IQ data.

7. A method for detecting interference in a wireless system, the method comprising:
receiving an uplink signal at a remote radio head in a distributed base station;
passing the uplink signal from the remote radio head to a baseband unit over a front-haul communication link as baseband IQ data;
intercepting the baseband IQ data at a tester coupled between the remote radio head and the baseband unit;
applying a non-linear transformation to the baseband IQ data;
determining whether an interfering signal is present based on the results of the non-linear transformation of the baseband IQ data;
wherein applying a non-linear transformation comprises applying one or more of a cyclic autocorrelation function to the baseband IQ data and calculating the spectral correlation density for the baseband IQ data.

8. A method for detecting passive intermodulation (PIM) interference in a wireless system, the method comprising:
transmitting tones in a downlink channel at a remote radio head of a distributed base station;
receiving an uplink signal at the remote radio head in the distributed base station;
passing the uplink signal from the remote radio head to a baseband unit over a front-haul communication link as baseband IQ data;
intercepting the baseband IQ data at a tester coupled between the remote radio head and the baseband unit;
applying spectral estimation to the baseband IQ data around an expected PIM interferer;
determining whether the expected PIM interferer is present based on the spectral estimation for the baseband IQ data;
further comprising establishing a noise floor of the distributed base station; and
wherein applying spectral estimation comprises gathering a set of an analysis metrics including power in the expected PIM interferer, a standard deviation and mean of the noise floor, and a bandwidth of the expected PIM interferer.

9. The method of claim 8, and further comprises testing the distributed base station by repeating the sending the tones in the downlink channel of the remote radio head, the receiving the uplink signals and saving a history of the tests.

10. The method of claim 9, and further comprises inserting a random delay between sequential tests of the testing of the distributed base station.

11. The method of claim 9, and further comprising:
comparing at least one of the analysis metrics to an associated threshold; and
updating one or more counters, each counter is correlated with a possible outcome of a test.

12. A tester, comprising:
at least one interface to communicatively couple the tester unit to a front-haul communication link used for communicating front-haul data to a remote radio head (RRH) having one or more antenna ports;
a programmable processor, coupled to the interface, configured to execute software, wherein the software is operable to cause the tester to do the following:
intercept baseband IQ data received from the remote radio head on the front-haul communication link;
calculate a signal statistic for the uplink signal from the baseband IQ data;
determine whether an interfering signal is present based on the signal statistic;
wherein calculating a signal statistic comprises calculating a peak-to-average power ratio;
and further de-noising the baseband IQ data prior to calculating the peak-to-average power ratio; and
wherein the de-noising comprises applying a wavelet packet decomposition to the baseband IQ data.

13. The tester of claim 12, wherein calculate a signal statistic comprises calculating a kurtosis value.

* * * * *